(12) United States Patent
Mohrmann et al.

(10) Patent No.: US 10,313,884 B2
(45) Date of Patent: Jun. 4, 2019

(54) MOTOR VEHICLE HAVING A COMMUNICATIONS DEVICE

(71) Applicant: FORD GLOBAL TECHNOLOGIES, LLC, Dearborn, MI (US)

(72) Inventors: Bjoern Mohrmann, Aachen (DE); Manuel Bojahr, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 15/404,321

(22) Filed: Jan. 12, 2017

(65) Prior Publication Data

US 2017/0208471 A1 Jul. 20, 2017

(30) Foreign Application Priority Data

Jan. 14, 2016 (DE) .................. 10 2016 200 385

(51) Int. Cl.
*H04L 29/06* (2006.01)
*H04W 12/08* (2009.01)
*B60R 16/023* (2006.01)
*H04L 29/08* (2006.01)

(52) U.S. Cl.
CPC .......... *H04W 12/08* (2013.01); *B60R 16/023* (2013.01); *H04L 63/02* (2013.01); *H04L 63/0209* (2013.01); *H04L 63/0428* (2013.01); *H04L 67/12* (2013.01)

(58) Field of Classification Search
CPC ................................. H04L 63/0428
USPC ......................................... 726/11
See application file for complete search history.

(56) References Cited

U.S. PATENT DOCUMENTS

| | | | |
|---|---|---|---|
| 2007/0226812 A1* | 9/2007 | Rosebrock | G06F 21/85 726/34 |
| 2014/0199965 A1* | 7/2014 | Cepuran | H04W 12/08 455/411 |
| 2014/0199989 A1 | 7/2014 | Cepuran et al. | |
| 2016/0006752 A1* | 1/2016 | Wilding | H04L 63/0245 701/26 |

FOREIGN PATENT DOCUMENTS

DE     102013003040 A1     8/2014

OTHER PUBLICATIONS

German Search Report dated Sep. 5, 2016 for German Application No. 102016200385.2, 7 pgs.
http://www.heise.de/security/meldung/Hacker-steuern-Jeep-Cherokee-fern-2756331.html, "Hacker steuem Jeep Cherokee fern", Nov. 23, 2016, 2 pgs.

* cited by examiner

*Primary Examiner* — Longbit Chai
(74) *Attorney, Agent, or Firm* — Frank Lollo; Brooks Kushman, P.C.

(57) ABSTRACT

The disclosure relates to a motor vehicle having a communications device. The communications device comprises at least one wireless communications module, which facilitates a wireless communications link between at least one vehicle component, which is connected via a communications line to the wireless communications module, and a communications partner. The motor vehicle also comprises an isolator that can be manually actuated and disconnects in hardware the wireless communications link between the vehicle component and the communications partner.

17 Claims, 1 Drawing Sheet

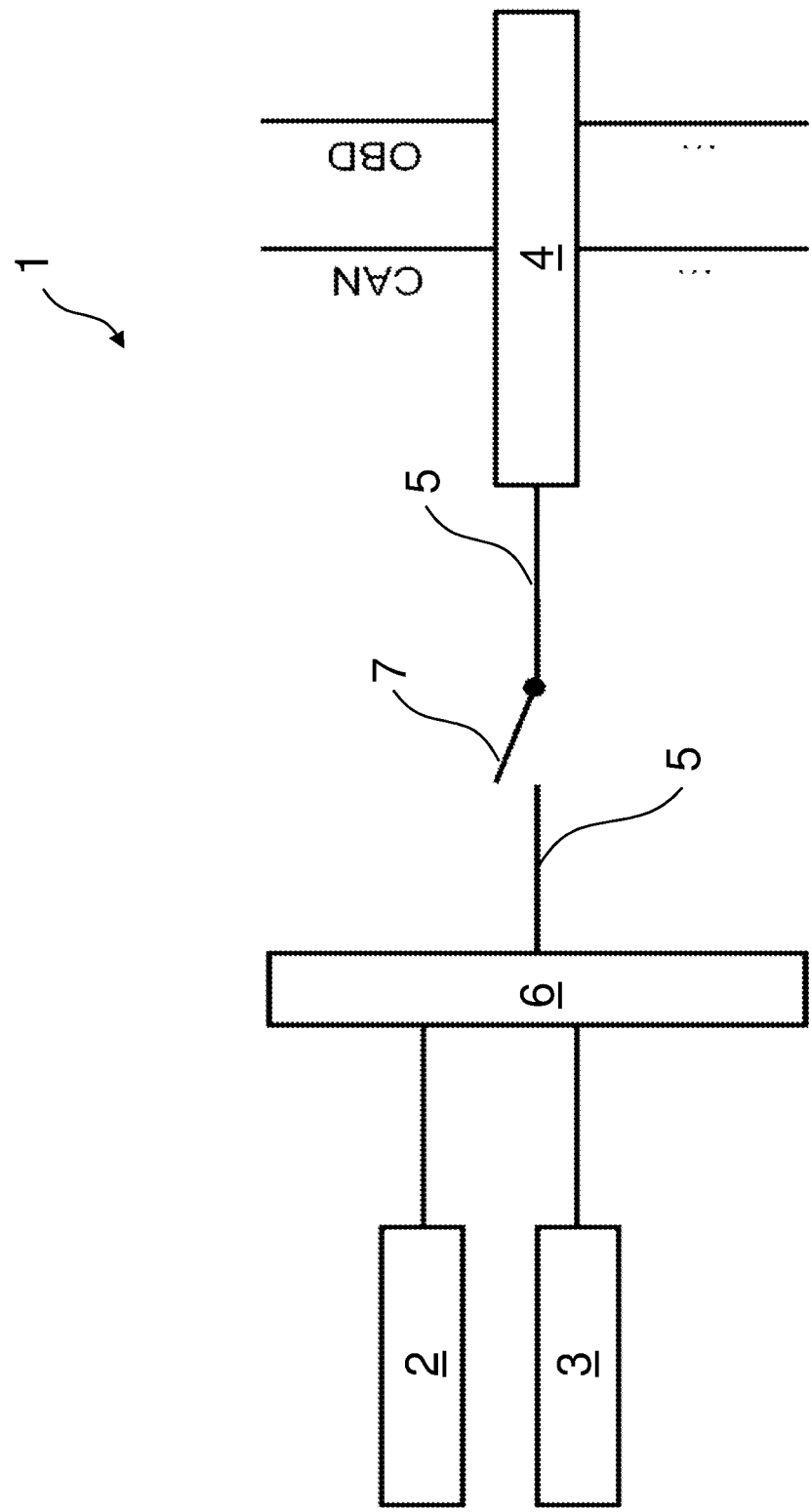

MOTOR VEHICLE HAVING A COMMUNICATIONS DEVICE

CROSS-REFERENCE TO RELATED APPLICATIONS

This application claims foreign priority benefits under 35 U.S.C. § 119(a)-(d) to DE 10 2016 200 385.2 filed Jan. 14, 2016, which is hereby incorporated by reference in its entirety.

TECHNICAL FIELD

The present disclosure relates to a motor vehicle having a communications device.

BACKGROUND

Communications devices in motor vehicles that facilitate a wireless communications link between a vehicle component of the motor vehicle and a communications partner, in particular a (off-board) communications partner that is not an integral part of the motor vehicle, are generally known. The term vehicle component can cover software applications implemented in a vehicle computer and also hardware modules such as an engine control module, for example. These are typically connected via a wired communications line to the wireless communications module, in order to use said module to establish the wireless communications link between the vehicle component and the communications partner, for example a cellular phone, a portable computer, another motor vehicle, a fixed terrestrial transceiver station or a satellite transceiver station.

Thus, modern vehicles are now often equipped with communications systems, for example WiFi, Bluetooth and/or GSM, for instance in order to be able to facilitate, via the air interface, emergency call functions, multimedia and navigation functions or even software updates of vehicle modules. Unfortunately, despite safeguards put in place, for instance by encrypting the wireless data transmission and/or using a firewall to protect against access to the vehicle component, an unauthorized person could use these wireless communications links to manipulate or even control the vehicle components via the wireless communications link, which may constitute a risk to the reliability of the motor vehicle and hence also to the safety of the occupants of the vehicle.

U.S. 2014/0199965 A1 and U.S. 2014/0199989 A1 disclose motor vehicles having communications devices. To prevent an unauthorized person from being able to use a wireless communications link from the vehicle without authorization, U.S. 2014/0199965 A1 proposes temporary deactivation of one or more wireless services of the motor vehicle by the authorized user. According to one embodiment, the user input for deactivation can be made by means of a pushbutton assigned to a human machine interface.

SUMMARY

Against this background, the object of the present disclosure is to provide a motor vehicle having a communications device, which motor vehicle has improved reliability. In particular, the aim is to achieve the increased reliability by simple means and to be able to guarantee this increased reliability at all times.

It should be pointed out that the features listed individually in the claims can be combined with one another in any technically sensible way to disclose further embodiments of the disclosure. The description additionally characterizes and specifies the disclosure in particular in association with the figures.

According to the disclosure, a motor vehicle comprises a communications device, which comprises at least one wireless communications module, for example a WiFi, Bluetooth or GSM module. The wireless communications module facilitates a wireless communications link between at least one vehicle component, for example a vehicle hardware module such as an engine control module or a software application implemented in a vehicle computer, and a communications partner, for example a cellular phone, a portable computer, another motor vehicle, a fixed terrestrial transceiver station or a satellite transceiver station. The at least one vehicle component is connected to the wireless communications module via a communications line. According to the disclosure, the motor vehicle comprises an isolator that can be manually actuated and disconnects, in hardware, the wireless communications link between the vehicle component and the communications partner. The isolator that disconnects in hardware the wireless communications link guarantees that the communications link can be disconnected at all times in response to the manual actuation of the isolator, for example by an occupant or a driver of the motor vehicle. Thus, the operator of the isolator can inhibit any wireless communication between the at least one vehicle component and a (out-board) communications partner, for instance if it is established that a behavior of the motor vehicle or vehicle components thereof suggests wrongful access to the vehicle components via the wireless communications link by an unauthorized third person. Since the wireless communications link is disconnected in hardware, i.e. by physical means, this disconnection is possible at all times and cannot be blocked, for instance by an error in the software behavior of the communications device.

According to an advantageous embodiment of the disclosure, the isolator is arranged in the communications line. The isolator is thereby able to disconnect the communications line, which the vehicle component is connected to the wireless communications module, and hence disconnect the wireless communications link between the vehicle component and the (out-board) communications partner. Other communications links, for example those links between a plurality of vehicle components of the same motor vehicle via bus systems that interconnect said components, for example fieldbus systems such as CAN or LIN and the like, are advantageously not affected by the isolator.

Alternatively, the isolator can be arranged in a power supply line connecting the wireless communications module to an electrical power source. On being actuated, the isolator is thereby able to disconnect the power supply to the wireless communications module, and hence disconnect the wireless communications link between the vehicle component and the (out-board) communications partner. It is also the case for this embodiment, as explained above, that other communications links between a plurality of vehicle components of the same motor vehicle are advantageously not affected by the isolator.

Another advantageous embodiment of the disclosure provides that the isolator is formed by an electronic or electromechanical switch. In other words, the isolator is embodied purely in hardware, which means that potential software errors cannot affect its operation. The isolator is thus guaranteed to operate as intended at all times.

According to another advantageous embodiment of the disclosure, the actuation function of the isolator is embodied purely in hardware. For example, the actuation function for actuating the isolator can be performed by electronic means or mechanical means or electromechanical means. Actuation, i.e. activation, of the isolator is thus guaranteed in this embodiment at all times.

Yet another advantageous embodiment of the disclosure provides that a firewall is inserted between the wireless communications module and the vehicle component, and the isolator is arranged in the communications line between the firewall and the vehicle component. The firewall increases the protection of wireless communications links and prevents or hinders at least access by unauthorized communications partners to the at least one vehicle component via the wireless communications module. Since, however, the firewall is implemented as a software application executed by a computer, owing to software errors it cannot be entirely guaranteed that it will operate correctly as intended. The isolator arranged between the firewall and the vehicle component, however, is able to disconnect in every situation the wireless communications link between the vehicle component and the (off-board) communications partner on being actuated, for example by an occupant of the motor vehicle.

According to an advantageous embodiment of the disclosure, a plurality of wireless communications modules is connected to the communications line via the firewall. The firewall can hence be used to bundle the wireless communications modules, and the isolator can be arranged solely in one communications line connecting the vehicle component to the firewall. A plurality of wireless communications links is possible simultaneously.

According to yet another embodiment of the disclosure, the plurality of wireless communications modules can have different wireless communications technologies, for instance technologies such as WiFi, Bluetooth, GSM and the like.

The motor vehicle preferably comprises autonomous or semi-autonomous driving functions. These allow driver-independent operation of the vehicle. Again for such a vehicle, it shall be possible for the isolator to disconnect the wireless communications link if it is established that this is necessary. The autonomous or semi-autonomous driving functions are then advantageously maintained.

Further features and advantages of the disclosure are given in the following description of an exemplary embodiment, which shall be understood to have no limiting effect and is described below in greater detail with reference to the drawing.

BRIEF DESCRIPTION OF THE DRAWINGS

The FIGURE shows, schematically, an exemplary embodiment of a communications device 1 of a motor vehicle (not shown) according to the disclosure

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the exemplary embodiment shown in the FIGURE, the communications device 1 comprises two wireless communications modules 2 and 3, of which the wireless communications module 2 has GSM transmission technology and the wireless communications module 3 has WiFi communications technology. The wireless communications modules 2 and 3 are each able to establish a wireless communications link, in the exemplary embodiment shown both a GSM link and a WiFi link, between a (on-board) vehicle component 4 and a (off-board) communications partner (not shown). For this purpose, the vehicle component 4, which may be, for example, a vehicle hardware module such as an engine control module or a software application implemented in a vehicle computer, is connected to the wireless communications modules 2 and 3 via a communications line 5.

The FIGURE also shows by way of example that the vehicle component 4 can be connected or networked via a CAN bus (Controller Area Network) and an OBD bus (On-Board Diagnostics) to other vehicle components, which are not shown here, to which the vehicle component 4 can maintain (usually wired) communications links.

It is also apparent from the FIGURE that in the exemplary embodiment shown of the communications device 1, both wireless communications modules 2 and 3 are not connected directly to the vehicle component 4 but through a firewall 6. This firewall monitors the data traffic transmitted via the wireless communications links respectively provided by the wireless communications modules 2 and 3 between the corresponding communications partner and the vehicle component 4. The firewall 6 primarily protects the vehicle component 4 from unauthorized access by a communications partner communicating with the vehicle component 4 via a wireless communications link. It cannot be guaranteed, however, for instance owing to programming errors in the firewall 6, that the firewall 6 identifies all unauthorized communications links of this nature.

In order to be certain of being able to protect the vehicle component 4 from an unauthorized wireless communications link of this type to a communications partner, an isolator 7 that can be manually actuated and disconnects in hardware the wireless communications link between the vehicle component 4 and the communications partner can be arranged, as shown in the FIGURE, in the communications line 5 between the firewall 6 and the vehicle component 4. The isolator 7 is preferably implemented as an electronic switch or electromechanical switch. Likewise, the actuation function of the isolator 7 is also implemented purely in hardware, for example electronically, mechanically or electro-mechanically. Thus, the proper operation of the isolator 7 can be guaranteed at all times, and the wireless communications link between a (off-board) communications partner and the vehicle component 4 can reliably be disconnected as and when required, for example by an occupant of the motor vehicle.

The motor vehicle according to the disclosure has been described in detail with reference to an exemplary embodiment shown in the FIGURE. The motor vehicle is not restricted to the embodiment described here, however, but also includes other equivalent embodiments. Thus, for instance, instead of arranging the isolator in the communications line connecting the vehicle components to the wireless communications line or the firewall, the isolator can be arranged in an electrical power supply line leading to the wireless communications module concerned, and hence the isolator can be used to de-energize the particular wireless communications module as and when required, in order that it is thereby possible to disconnect reliably an existing wireless communications link between the (on-board) vehicle component and a (off-board) communications partner.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A communications device for a vehicle comprising:
   at least one wireless communications module configured to perform autonomous or semi-autonomous driving functions, configured to facilitate a wireless communications link between at least one vehicle component connected via a communications line to the wireless communications module, and an out-board communications partner; and
   an isolator configured to manually disconnect the wireless communications link between the vehicle component and the out-board communications partner to prevent unauthorized access to the vehicle component without disrupting the wireless communication module to maintain the autonomous or semi-autonomous driving functions, wherein the isolator is arranged on a wireless communication line leading to the wireless communications module and is used to de-energize the wireless communications module so as to disconnect the wireless communications link between the vehicle component and the out-board communications partner.

2. The communications device as claimed in claim 1, wherein the isolator is arranged in the communications line.

3. The communications device as claimed in claim 1, wherein the isolator is arranged in a power supply line connecting the wireless communications module to an electrical power source.

4. The communications device as claimed in claim 1, wherein the isolator is formed by an electronic or electromechanical switch.

5. The communications device as claimed in claim 1, wherein actuation of the isolator is implemented purely in hardware without software.

6. The communications device as claimed in claim 1 further comprising a firewall inserted between the wireless communications module and the vehicle component, such that the isolator is arranged in the communications line between the firewall and the vehicle component.

7. The communications device as claimed in claim 6, wherein a plurality of wireless communications modules is connected to the communications line via the firewall.

8. The communications device as claimed in claim 7, wherein each of the plurality of wireless communications modules uses a different wireless communications technology to facilitate the wireless communication link.

9. A plurality of vehicle components of a motor vehicle comprising:
   a wireless communications module configured to perform autonomous or semi-autonomous driving functions, configured to connect, via a communications line, to a component within a vehicle and to establish a communication link between the component and an out-board communications partner; and
   an isolator disposed within the communications line, between the component and the wireless communications module, the isolator being configured for manual actuation such that, in response to actuation of the isolator by a vehicle occupant, the component is manually disconnected from the wireless communications module to prevent unauthorized access to the component without disrupting the wireless communication module to maintain the autonomous or semi-autonomous driving functions, wherein the isolator is arranged in the communication line leading to the wireless communications module and is used to de-energize the wireless communications module so as to disconnect the communications link between the vehicle components and the out-board communications partner.

10. The vehicle as claimed in claim 9, wherein the component is an engine control module.

11. The vehicle as claimed in claim 9, wherein the communications partner is a satellite transceiver station.

12. The vehicle as claimed in claim 9, wherein the communications partner is another vehicle.

13. The vehicle as claimed in claim 9 further comprising a firewall disposed between the wireless communications module and the component, wherein the isolator is arranged in the communications line between the firewall and the component such that the isolator is configured to disconnect the wireless communications module and another wireless communications module from the component.

14. A communication system for a vehicle comprising:
   an engine control module;
   a wireless communications module, for performing autonomous or semi-autonomous driving functions, connected, via a communication line, to the engine control module such that a communication link between the engine control module and a cellular phone is established through the wireless communication module; and
   an isolator disposed within the communication line between the engine control module and the wireless communications module, wherein manual actuation of the isolator manually disconnects the engine control module from the wireless communication module to sever the communication link between the engine control module and the cellular phone without disrupting the wireless communication module to maintain the autonomous or semi-autonomous driving functions, wherein the wireless communications module is further configured to maintain autonomous or semi-autonomous driving functions during actuation of the isolator, and wherein the isolator is arranged in the communication line leading to the wireless communications module and is used to de-energize the wireless communications module so as to disconnect the communications link between the engine control module and the cellular phone.

15. The communication system as claimed in claim 14 further comprising a firewall disposed in the communication line and being configured to connect a plurality of wireless communications modules to the communication line.

16. The communication system as claimed in claim 15, wherein the isolator is disposed in the communication line between the firewall and the wireless communications module such that the isolator severs the communication link through the communication line in response to actuation of the isolator.

17. The communication system as claimed in claim 14 further comprising a manual switch, wherein actuation of the manual switch actuates the isolator.

* * * * *